Figure 1:
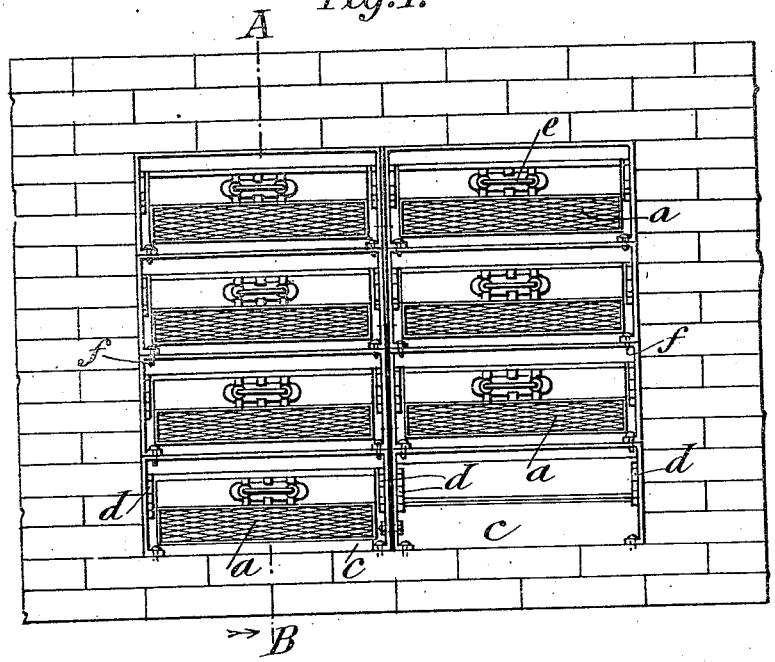

Dec. 30, 1924.

H. WITTEMEIER

FILTER FOR PURIFYING THE AIR

Original Filed Jan. 5, 1921

1,521,576

INVENTOR
Hans Wittemeier
BY C. P. Goepel
ATTORNEY.

Patented Dec. 30, 1924.

1,521,576

UNITED STATES PATENT OFFICE.

HANS WITTEMEIER, OF BERLIN, GERMANY.

FILTER FOR PURIFYING THE AIR.

Original application filed January 5, 1921, Serial No. 435,288. Divided and this application filed March 15, 1924. Serial No. 699,597.

*To all whom it may concern:*

Be it known that I, HANS WITTEMEIER, a citizen of Germany, and a resident of Berlin, Germany, have invented certain new and useful Improvements in Filters for Purifying the Air, of which the following is a specification.

In many technical processes and plants the purification of the air plays an important part. In heating and ventilating plants the cleaning of the air is necessary for hygienic reasons; in turbo-generators, compressors and the like the air must be deprived of dust in order to secure their reliability of operation which would be impaired by dirt that would rapidly collect in sensitive parts of the machines.

An object of the present invention is to provide a filter which is made up of a plurality of interchangeable sections or units adapted to be assembled in any suitable number for width and height of the filter and which are so constructed that one section may be secured to the other, so that they interbrace and support each other without the use of additional means.

Another object of the invention is to provide a filter element with a docket like opening into which is slidably fitted a filter to position the latter obliquely to the line of draft through the filter and to insure the retention of the filter in its opening, particularly when the filter is subjected to vibration incident to use in proximity to heavy high speed machines.

A further object of the invention is to provide a slidable filter with means for sealing it in its chamber when the filter is slid into place so as to effectively seal the filter in its inclined position in the chamber.

This application is a divisional application of my copending application Serial No. 435,288, filed January 5, 1921, and the present invention relates specifically to a specific embodiment of the invention set forth in the foregoing application.

The invention is illustrated in the drawings in which—

Figure 2:
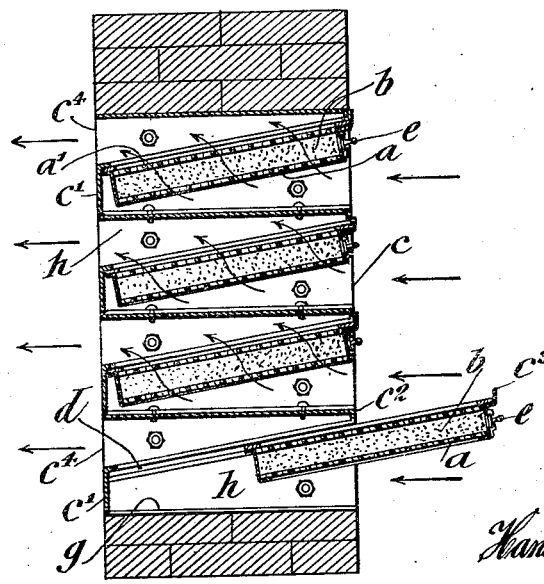

Figure 1 is a front view of a wall having a plurality of filters therein arranged, and Figure 2 is a vertical section on line A—B of Figure 1, showing the filter elements arranged in an inclined or slanting position in a separate cell or aperture in the wall.

Similar characters of reference indicate corresponding parts.

Referring to the drawings, it will be seen, that there is shown a special method of constructing the individual filter panels and the individual filter cells attached thereto, as well as a special manner of arranging these panels and cells in openings in a filter bay that is built into an opening in a wall. The arrangement according to these figures is such that the filter walls, between which the dust or moisture-retaining bodies are enclosed, do not extend vertically, i. e., at right angles to the direction of the hole or passage through the wall in which the filter is placed, but are arranged in a slanting position. The current of air which passes through the wall is thus deflected by the air filter from its normal direction.

This arrangement offers considerable advantages. In the first place, the effective surface of the filter is very much greater than the cross-sectional area of the air channel or passage, which latter, in ordinary arrangements, is approximately equal to the area of the filter. Secondly, the novel arrangement renders it possible to so arrange the filter cells that each individual cell may be conveniently taken out and replaced, this being important for the cleaning and renewing of the dust-retaining coating of the dust-retaining bodies. The cells filled with the dust-retaining bodies are pushed into slideways $d$ in the filter bay in a similar manner to a chest of drawers. The slideways $d$ are arranged to be perfectly dust-tight so that no dust can pass through any part of the filter passage. I prefer to arrange these drawers so that they get an inclination to the backward, so that they tighten themselves by their weight aided by the vibrations of the room or the machine with which they are connected.

Another advantageous feature is that the filter cells and sliding frame are easily constructed of very simple elements consisting of pieces of sheet of uniform size, each of which is simply bent into the form of a long angle bar. The slideways are also made by thus bending pieces of sheet metal of uniform size.

Figure 1 is a front view and Figure 2 is a vertical section of a filter bay of this kind. Inserted between the sloping filter walls $a$ are filtering bodies $b$. The filter cells are slipped into the docket-like openings c of the bay, the lateral sliding bars at the top of the cells being adapted to slide in the lateral slideways d attached to the side walls of the openings c. Handles e are provided by which the individual filter cells can easily be pulled out. The bottom cell is shown drawn half way out in Figure 2. The individual frames of the bay are preferably screwed together by screws f. The rear of each chamber is provided with a wall $c^1$, and the front of each chamber with a short front wall $c^2$. The drawer has an upwardly extending part $c^3$. These parts $c^1$, $c^2$, and $c^3$ act to prevent air from entering or leaving therethrough so that all the air enters at the open front c, and leaves at the open rear $c^4$, entering the filter at a and leaving it at $a^4$.

When one cell has been withdrawn for cleaning purposes it can be readily substituted by a clean cell, and thereby the installation can be kept in operation.

In the embodiment of Fig. 2 the air flows in a horizontal direction, and meets the front face a of a filter cell which is arranged diagonally in respect to the horizontal air flow. Similarly, the air leaves the diagonally arranged rear wall $a^1$ in parallel horizontally arranged streams. Of course, instead of being horizontal, the flow can be vertical, the essential being a diagonally arranged filter cell in the path of the air flow. By this there is obtained a large surface of the air when it meets the filter surface and as it leaves the filter surface.

From the foregoing it will be seen that the filter body b rests upon the lower wall a, and in consequence thereof the upper wall $a^1$ may be omitted, since the filter material itself will be supported in the bottom and side walls. It will also be seen that the slideways d support the filter and hence means may be provided which only support the filter and not necessarily guide the same in a sliding manner. The essential here is the support of the filter in an inclined position in respect to the air flow. In the embodiment shown two slideways have been shown but a modified form may provide one single slideway for the filter. In the embodiment shown the filter has its frame cooperating at the upper part of the filter with the slide-ways, but the slide-ways may also be arranged to cooperate with the lower part of the filter. In the embodiment shown in the drawings the slideways also serve the function of providing an air-proof barrier. But other means of supporting the filter may be provided, in which case suitable air barrier means would then be provided.

In the embodiment shown, the filter moves downwardly along the slide and when it is in its lowermost position it tightly secures the rear end and prevents any air from passing through any connecting portions, so that all the air must pass through the filter body b. In certain embodiments also the lowermost edge of the filter casing may rest upon the lowermost wall of the openings so that this lowermost edge will also serve to act as an air barrier to prevent the flow of air, necessitating it to pass through the filter bodies.

The triangular spaces above and below the filters, it will be noted, have their shortest side facing the front and rear, so that the air entering this shortest side, passes inwardly until it strikes the diagonally arranged filter so that such triangular spaces by no means form air ducts; on the contrary, the air is rather expanded than concentrated, as would be the case with air ducts. By arranging the filters diagonally to the air flow, it is clear that smaller sized filters may be used than when the air strikes the filters perpendicularly, this being true because the filters are arranged along the hypotenuse of the triangular spaces.

Another advantage of the filters arranged in the manner shown and described is that due to vibrations in the engine-room or the like, the dust is shaken from the filter bodies and falls on the bottom wall where it can be readily removed by scrapers or the like. Therefore, the filter can be much longer in service before necessitating its cleaning, since part of the dust gathered from the air by the filter body may be continually shaken from the filter to the bottom wall. Such shaking or agitation is particularly advantageous since considerable dust gathers on the front wall a of the filter and its being continually shaken off, maintains a relatively clear surface at the front thereof. A further advantage is that the units and the several parts described can be made of standard materials interchangeable throughout.

It will be noted that the frames or casings h are superposed on each other, and joined by bolts f, and are also laterally arranged as shown in Figure 1. Such frames or casings, by being placed on each other, each support the other, requiring no special supporting means.

I claim:

1. In a filter, the combination of a casing having a plurality of compartments therein, lateral slideways arranged at the inner opposite sides of the compartments and inclining backwardly and downwardly from the front of the casing, filter cells for said compartments having lateral sliding bars adapted to engage in said slideways, closure walls rising from the bottoms of the said compartments and extending to said slideways for closing the lower portions of the compartments and interlocking parts at the front of the compartments and at the outer ends of said filter cells for sealing the upper portions of the compartments.

2. In a filter, the combination of a casing having a plurality of compartments, lateral slideways attached to the inner side walls of the compartments and inclining backwardly and downwardly from the front of the casing, filter cells for said compartments having lateral sliding bars at their tops adapted to engage in said slideways, said compartments having rear walls extending entirely across the same and between the rear ends of the slideways and the bottoms of said compartments and having short depending front walls across the tops of the compartments, said filter cells having upturned lips on their outer ends adapted to overlap said front walls to seal the filter cells in the compartments.

In testimony that I claim the foregoing as my invention I have signed my name hereunder.

HANS WITTEMEIER.